United States Patent [19]

Pan

[11] Patent Number: 5,775,808
[45] Date of Patent: Jul. 7, 1998

[54] APPARATUS FOR REAL-TIME, IN SITU MEASUREMENT OF TEMPERATURE AND A METHOD OF FABRICATING AND USING SAME

[75] Inventor: Shaoher X. Pan, San Jose, Calif.

[73] Assignee: Applied Materials, Inc., Santa Clara, Calif.

[21] Appl. No.: 703,500

[22] Filed: Aug. 27, 1996

Related U.S. Application Data

[63] Continuation of Ser. No. 665,938, Jun. 19, 1996.

[51] Int. Cl.$^6$ .................................................. G01K 11/20
[52] U.S. Cl. ............................ 374/161; 374/131; 374/137
[58] Field of Search ................................ 374/101, 110, 374/131, 137, 161, 162, 166; 250/227.14, 227.18, 238

[56] References Cited

U.S. PATENT DOCUMENTS

| | | | |
|---|---|---|---|
| 4,652,143 | 3/1987 | Wickersheim et al. | 374/161 |
| 4,752,141 | 6/1988 | Sun et al. | 374/161 |
| 4,842,683 | 6/1989 | Cheng et al. | 156/345 |
| 4,906,106 | 3/1990 | Kaufmann et al. | 374/131 |
| 5,183,339 | 2/1993 | Wickersheim et al. | 374/161 |
| 5,213,985 | 5/1993 | Sandroff et al. | 374/161 |
| 5,225,024 | 7/1993 | Hanley et al. | 156/345 |
| 5,299,869 | 4/1994 | Wissinger | 374/137 |
| 5,556,204 | 9/1996 | Tamura et al. | 374/161 |

FOREIGN PATENT DOCUMENTS

| | | | |
|---|---|---|---|
| 2197946 | 6/1988 | United Kingdom | 250/227.18 |

*Primary Examiner*—G. Bradley Bennett
*Attorney, Agent, or Firm*—Thomason & Moser

[57] ABSTRACT

Apparatus having a plurality of temperature sensors (probes) positioned at a number of locations upon a platform such as a placebo or dummy wafer and a method of fabricating and using the apparatus. The temperature sensors are photoemissive temperature sensors. To fabricate each of the photoemissive sensors, a thermally conductive epoxy is placed in a mound at each sensor location upon the platform. Upon one side of this mound, a coating of phosphorous material is applied. One end of a fiber optic cable abuts the phosphor material, and a an encapsulation layer such as a polyimide tape is positioned atop the conductive epoxy and the fiber optic cable such that the fiber optic cable is maintained in a stationary position relative to the phosphor material to obtain a local temperature of the wafer surface.

8 Claims, 6 Drawing Sheets

APPARATUS FOR REAL-TIME, IN SITU MEASUREMENT OF TEMPERATURE AND A METHOD OF FABRICATING AND USING SAME

CROSS REFERENCE TO RELATED APPLICATION

This application is a continuation of our copending patent application Ser. No. 08/665,938, filed on Jun. 19, 1996 and entitled APPARATUS FOR REAL-TIME, IN SITU MEASUREMENT OF TEMPERATURE AND A METHOD OF FABRICATING AND USING SAME.

BACKGROUND OF THE DISCLOSURE

1. Field of the Invention

The invention relates to test and measurement apparatus for measuring temperature, and more particularly, to apparatus for simultaneously measuring temperature at a plurality of locations within, for example, a plasma reaction chamber of a semiconductor wafer processing system.

2. Description of the Background Art

Wafer temperature has a significant effect on semiconductor process performance. However, it is very difficult to determine the wafer temperature in situ and in real time because the wafer is enclosed in a reaction chamber during processing. Most often, wafer temperature is estimated by attaching temperature sensing "dots" onto the surface of a wafer. These dots contain certain temperature sensitive chemicals that change color depending upon the temperature at the dot location on the wafer. As such, test wafers having a plurality of dots thereupon can be processed, removed from the chamber and a technician can note the various colors of the dots and approximate the temperature at the various locations. In response to the temperature estimates, processing of the next test wafer can be altered and the test repeated in an attempt to optimize the temperature distribution. However, such a method of controlling temperature is relatively inaccurate since there is a time delay between when the wafer is at temperature within the chamber and when it can be monitored by the technician. Also, repeatedly processing test wafers is costly.

Another technique that finds use in the semiconductor industry is using a two-dimensional infrared charge-coupled device (CCD) camera to directly monitor the wafer surface temperature during processing. The CCD camera is generally mounted on the outside of the reaction chamber and images the wafer through a window portal located in the side of the reaction chamber. As such, the CCD camera provides a two-dimensional image representing the wafer temperature distribution, in real time, across the surface of the wafer. Since the CCD sensor is not capable of withstanding exposure to the plasma within the reaction chamber nor the processes that occur within the chamber, the sensor is relegated to being mounted in a position outside of the reaction chamber. As such, for older systems, the CCD camera is retrofitted to a chamber window, if available. In some systems, the CCD camera cannot be mounted in a location that provides a view of the wafer that would result in effective temperature measurements. Thus, CCD camera mounting equipment is generally used in new commercial semiconductor industry equipment that is specifically designed for camera installation.

Therefore, a need exists in the art for apparatus that accurately measures, in real time, the temperature of a wafer within a semiconductor wafer processing system.

SUMMARY OF THE INVENTION

The disadvantages heretofore associated with the prior art are overcome by the present invention which is a detector array having a plurality of temperature sensors fabricated upon a platform such as a placebo or dummy wafer. Specifically, the present invention is apparatus having a plurality of photoemissive temperature sensors (probes) positioned at a number of locations upon a placebo or dummy wafer. To fabricate each of the photoemissive sensors, a high thermally conductive epoxy is placed in a mound at each location. One side of this mound is then coated with a phosphorous material. The end of a fiber optic cable is positioned proximate the phosphor, and a polyimide tape is positioned atop the conductive epoxy and the fiber optic cable such that the fiber optic cable is affixed to the placebo wafer and is maintained in a stationary position relative to the phosphor.

To measure temperature at each sensor location, the inventive apparatus is positioned within a semiconductor processing system by positioning the placebo wafer into the reaction chamber. As the placebo wafer is processed in the normal manner as a wafer would be processed in the chamber, the thermal conductive epoxy will heat, causing a chemical change in the phosphor. Once at temperature, the distal end of each fiber optic cable is provided a pulse of light from, for example, a xenon flash tube. The light pulse causes the phosphor to fluoresce. The temperature measurement is made by measuring the rate of decay of the fluorescence of the phosphor. Correlating the temperature measurements from all the sensors provides a two-dimensional profile of the temperature distribution in real time.

An efficient phosphor material is magnesium-fluorogerminate activated with tetravalent manganese. When excited, this phosphor emits red light and can be excited by short wavelength visible as well as ultraviolet radiation. The sensor material is able to withstand high temperatures, is relatively insoluble chemically, and is quite benign from a biological standpoint. To excite a multitude of sensors at once, a xenon flashlamp can be connected to the distal end of all of the fiber optic cables. Measurement accuracy can be made typically to ±2° C., or better, over most of the working range of a sensor without calibration. If sensor calibration is performed, accuracy of each sensor can be improved to ±0.2° C. or better. Consequently, the invention provides a reliable technique for performing in situ, real time temperature measurement in a semiconductor wafer processing system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
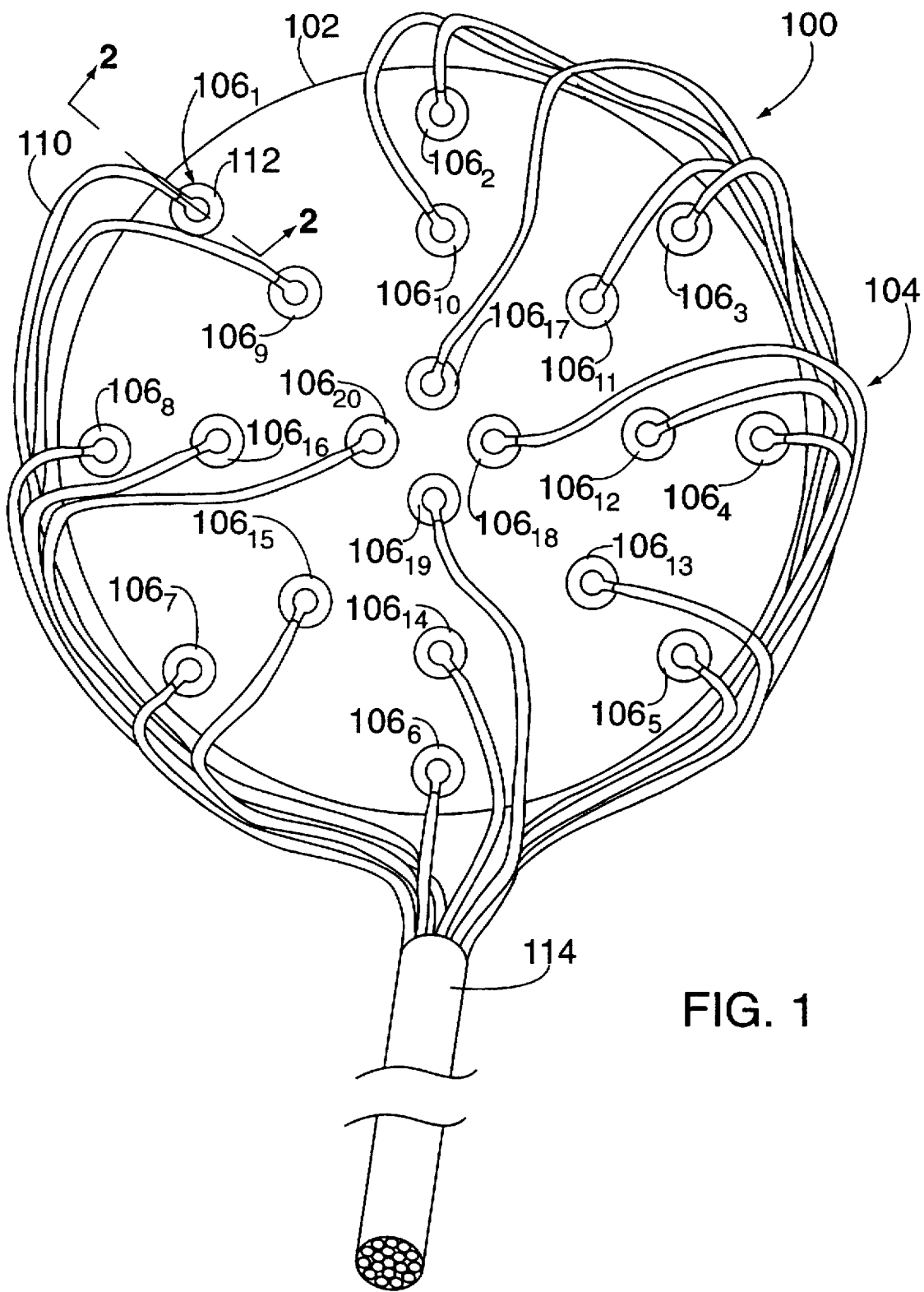
FIG. 1 depicts a top plan view of apparatus for measuring temperature profiles in accordance with the present invention.
Figure 2:
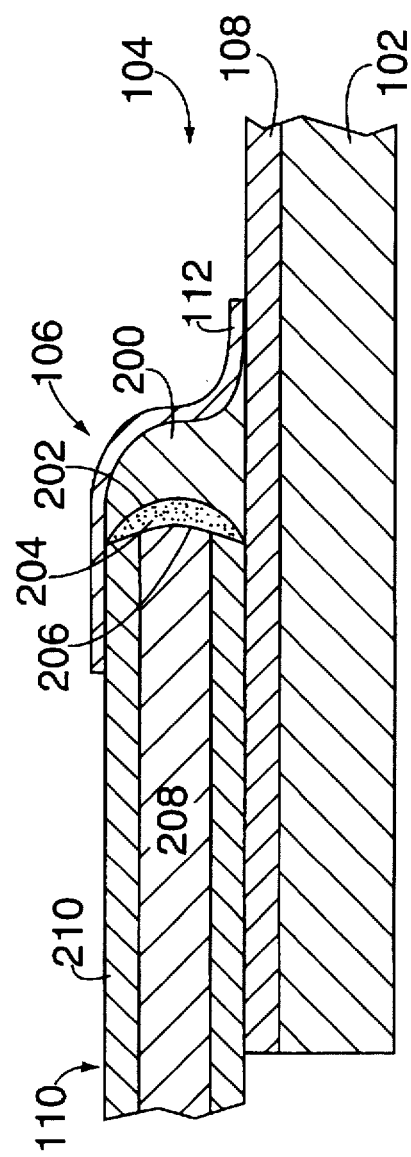
FIG. 2 depicts a cross-sectional view of the apparatus along line 22 in FIG. 1.

FIG. 1 depicts a top plan view of apparatus for measuring temperature in, for example, a semiconductor wafer processing system. In the depicted embodiment, the invention is shown in the form of a diagnostic wafer 100 having the inventive apparatus 104 affixed to a placebo wafer (or dummy) wafer 102. FIG. 2 is a cross-sectional view of an individual sensor 106 taken along line 2—2 shown in FIG. 1. To best understand the invention, the reader should simultaneously refer to both FIGS. 1 and 2.

Preferably, the placebo wafer 102 is a silicon wafer having dimensions equivalent to a semiconductor wafer that it replaces within a semiconductor wafer processing system. In particular, the diameter and thickness of the placebo wafer are the same as a semiconductor wafer to be processed such that the bottom surface of the placebo wafer can be mounted to a chuck or a wafer pedestal within the processing system just as would the process wafer. The chuck then supports the placebo wafer within the processing system in a location that insures that the placebo wafer experiences the same temperature profile as a process wafer would experience in that same location. As such, any measuring instrumentation attached to the placebo wafer measures the environment within the processing system as it would be generated proximate the process wafer.

By using a placebo wafer to support the inventive apparatus, the wafer heating/cooling techniques normally used by the semiconductor wafer processing system to control wafer temperature can be used to control the temperature measuring apparatus. For example, to maintain the apparatus of the present invention at a substantially constant temperature, a backside cooling gas, e.g., helium, can be applied to the interstitial spaces between the placebo wafer and the support surface of the chuck. Generally speaking, since the apparatus mounted to the placebo wafer experiences the same environmental conditions as a wafer when being processed, whatever environmental controls is available to adjust the environment surrounding a wafer are applicable to adjusting the environment surrounding the apparatus of the present invention.

Since process wafers generally are coated with a silicon dioxide layer (oxide layer), the placebo wafer should also have such a coating to best simulate a process wafer. As such, the placebo wafer 102 is generally coated with a silicon dioxide layer 108 (oxide layer) to simulate process wafer conditions near the various temperature probes 106 that are mounted upon the placebo wafer surface. In this manner, each of the temperature probes experiences the same local temperature as would be experienced at the surface of a process wafer. However, the oxide layer is not necessary to the operation of the invention and should be considered optional.

More specifically, the placebo wafer 102 supports upon its oxide layer 108 a plurality of phosphor-based fiber optic temperature probes $106_n$ (n being an integer value greater than or equal to 1). In the illustrative embodiment, there are twenty such temperature probes $106_1$ through $106_{20}$. However, those skilled in the art will certainly understand that any number of temperature probes may be used to implement the invention. The temperature probes are arranged in array such that the properties of the plasma can best be determined over the entire surface of the wafer. Although a concentric array is depicted, any arrangement of temperature probes may be used.

More specifically, upon the placebo wafer 102 is affixed a pattern of fiber optic phosphor-based temperature probes.

Each probe 106 comprises a mound 200 of thermally conductive epoxy having one side 202 that has a concave shaped surface. Other surface shapes, e.g., flat, could be used. One example of an epoxy is a high thermal conductivity, low temperature curing resin available as Duralco model 4703 from Cotronics Corporation. This epoxy is effective up to 315 degrees Celsius.

Upon the concave surface is deposited a layer 204 of phosphorous material such as magnesium fluorogerminate activated with tetravalent manganese. When excited, this phosphor emits red light and can be excited by short wavelength visible as well as ultraviolet radiation. Furthermore, such a material is able to withstand high temperatures, is relatively insoluble chemically, and is quite benign from a biological standpoint.

A fiber optic cable 110 is affixed to the surface of the oxide layer 108 and oriented such that an exposed end 206 of the fiber optic cable 110 abuts the layer 204 of phosphor material. A polyimide film adhesive tape 112 is positioned atop the epoxy mound 200 and the end 206 of the fiber optic cable 110 such that background light does not become incident upon the exposed end of the fiber optic cable or the phosphor material. Thus, the probe is encapsulated by the insulator tape. Polyimide is an illustrative encapsulation material. Other materials that can be used are silicon, quartz, ceramic, silicon carbide, and the like. The particular material used generally depends upon the application for the diagnostic wafer (e.g., for measuring temperature in an oxide etch system, the encapsulation material is a ceramic)..

The fiber optic cable 110 has an optical core 208 having a 0.7 millimeter diameter and generally has an outer cladding 210 that has a diameter of 1 millimeter. The height of the conductive epoxy mound is approximately 0.8 millimeters and the width of the mound is approximately 0.5 millimeters. The overall height of the entire probe is approximately 1.2 millimeters. The fiber optic cables are generally routed along the surface of the placebo wafer to avoid any interference with the plasma within the process chamber during temperature measurement. The individual fibers are bundled and extend from the diagnostic wafer within a jacket as a connector tail 114.

Figure 3:
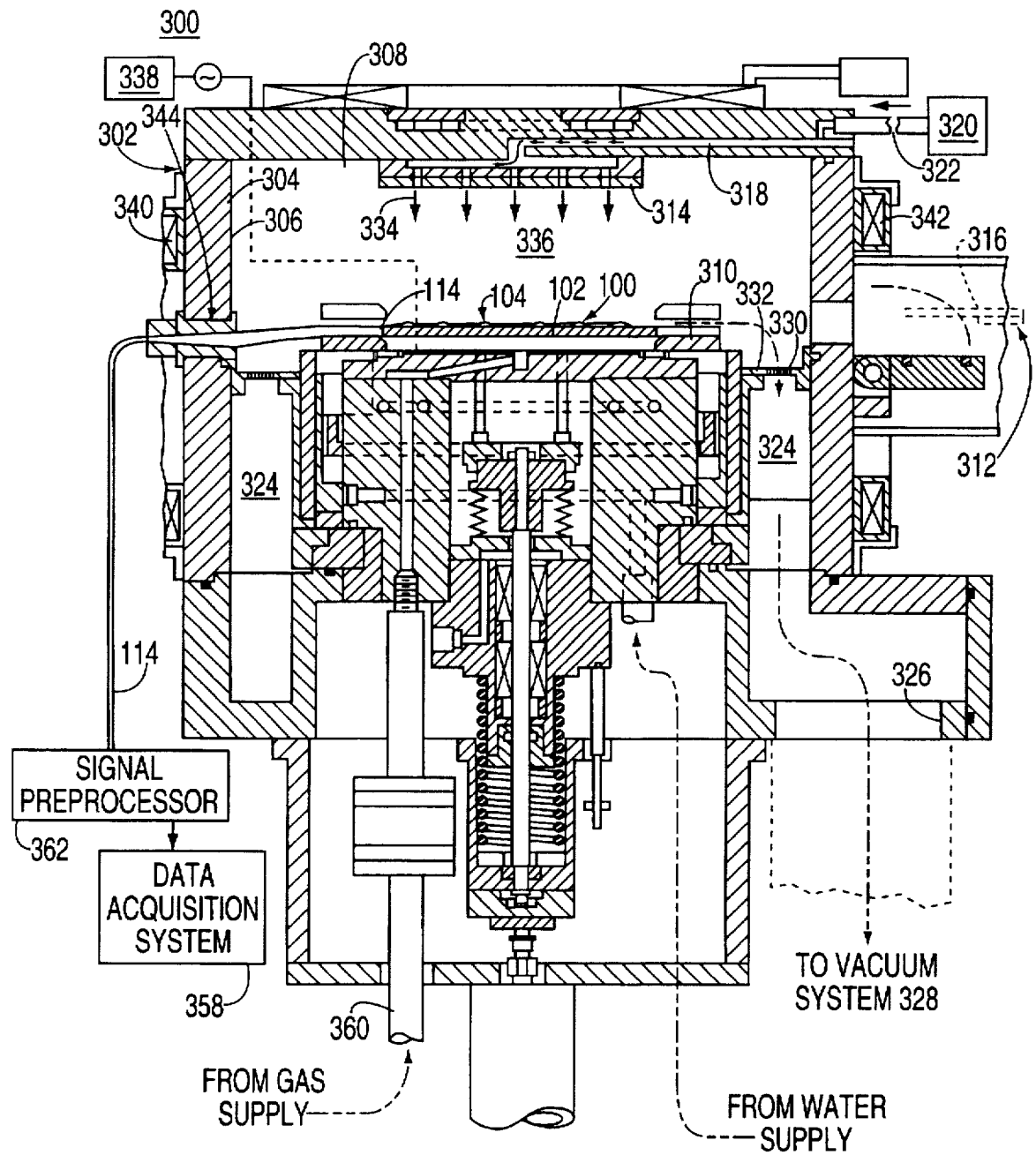
FIG. 3 depicts a cross-sectional view of a semiconductor wafer etching system adapted to incorporate the present invention.

FIG. 3 depicts an illustrative use for the inventive apparatus within a semiconductor processing system, specifically, a magnetic field enhanced plasma reactor system 300. Such a system is described in detail and commonly assigned U.S. Pat. No. 4,842,683, issued Jun. 27, 1989, and entitled "Magnetic Field Enhanced Plasma Reactor"; U.S. Pat. No. 5,225,024, issued Jul. 6, 1993, and entitled "Magnetically Enhanced Plasma Reactor System"; and U.S. patent Ser. No. 08/431,178, filed Apr. 28, 1995, and entitled "Method and Apparatus for Producing Plasma Uniformity in a Field Enhanced Plasma Reactor." The patents and the application are incorporated herein by reference.

Specifically, the system 300 comprises a housing 302 having octagon-shaped outer walls 304 and a circular inner wall 306 defining a reaction chamber 308. The system also includes a gas and liquid cool pedestal/cathode assembly 310 and a wafer (substrate) exchange system 312. The wafer exchange system 312 cooperates with the pedestal assembly 310 to facilitate positioning a wafer 316 upon assembly 310 and removing the process wafer 316 from the chamber 308 after etching.

The gas supply system 320 supplies, via a gas manifold 314, process gases to the interior of the chamber 308. The gas supply system 320 communicates with the manifold 314 and chamber 308 via supply line 322 and conduit 318.

Vacuum is supplied to the chamber and spent gases are exhausted via annular exhaust chamber 324 communicating with exhaust port 326 connected to a vacuum pumping system 328. The exhaust flow is directed from the chamber 308 through holes 330 in a horizontal annular plate 332 mounted about the upper periphery of the cathode assembly 310. The plate 330 inhibits plasma penetration into the annular exhaust chamber 324.

Conduit 318 routes a reacting gas such as carbon tetrafluoride ($CF_4$) from supply line 322 into manifold 314. The gas exits the manifold downwardly (as indicated by arrows 334). When RF power is applied to the cathode assembly 310, an etching plasma is formed in chamber processing region 336. An RF power supply 338 supplies RF power to the reactor system 300 to generate the plasma.

To control the plasma, the reaction system 300 further includes a number of paired electromagnetics 340 and 342, typically comprising copper coils, mounted in a rectangular array, one each on alternating outer walls of the octagon-shaped housing 304.

The remaining component parts of the reactor system depicted in FIG. 3 form an operational reactor system in which the present invention is incorporated. A full discussion of all the component parts is presented in the commonly assigned patents and application referred to above and incorporated herein by reference.

To measure temperature distribution within the chamber 308, the diagnostic wafer 100 (i.e., the inventive apparatus 104 affixed to a placebo wafer 102) is positioned upon the pedestal assembly 310 in the usual position of a process wafer. The connector tail 114 extends from the temperature probes toward the feed-through connector 344, e.g., an O-ring. The feed-through connector 344 is vacuum sealed to a chamber wall 304. The fiber optic cable 114 passes through the feed-through connector and exits the chamber. The fiber optic cable distal ends are terminated at a data acquisition system 358 that, when measuring temperature, applies an excitation pulse of light to the fiber optic cable ends and measures the rate of decay for the emission from the phosphor in response to the excitation pulse. An applicable data collection, analysis and display system is disclosed in commonly assigned U.S. patent application No. 08/621,279, filed Mar. 22, 1996, herein incorporated by reference. The data collection, analysis and display system processes analog data; thus, the data to the data acquisition system 358 is preprocessed using a conventional optical-to-digital converter that converts the light from each of the fibers into a digital signal. Such a converter is available from Luxtron Corporation as a model 504 Interface Board. The model 504 includes a flash tube for supplying the pulse of light to excite the phosphor material in the temperature probes.

In operation, the placebo wafer is positioned in the chamber 308 upon pedestal 310 and the apparatus 104 is attached to the data acquisition system 358 via the feed-through connector 344 as discussed above. If the pedestal contains an electrostatic chuck, the chuck is powered to retain the placebo wafer on the pedestal. Reactant gas is supplied to the chamber via conduit 318 and manifold 314, while backside cooling gas is supplied via conduit 360 to the backside of the placebo wafer 102. The RF source 338 then applies power to the pedestal to strike a plasma within region 336. To measure the temperature at the various probe locations upon the placebo wafer, the data acquisition system 358 excites all the probes simultaneously with an excitation pulse, typically generated by a xenon flashtube (not shown). The excitation pulse excites the phosphor within each probe which causes the phosphor to emit a particular spectrum of light, e.g., in the range of 600 to 700 nanometers for a magnesium fluorogerminate phosphor. The data acquisition system 358 detects the emission from the phosphor and tracks the rate of decay of the emissivity of the phosphor. This emissivity rate of decay is indicative of the temperature of the phosphor at the time of the excitation pulse. The theory of operation of phosphor-based temperature probes is known in the art and one such temperature measurement technique is disclosed in Wickersheim et al., "Fiberoptic Thermometry and its Applications", J. Microwave Power, pp. 85–94 (1987).

By periodically measuring the temperature at a plurality of probe locations, the data acquisition system provides a comprehensive time lapse temperature profile for a wafer processing system. As such, the invention provides an in situ, real time temperature measuring tool.

Figure 4:
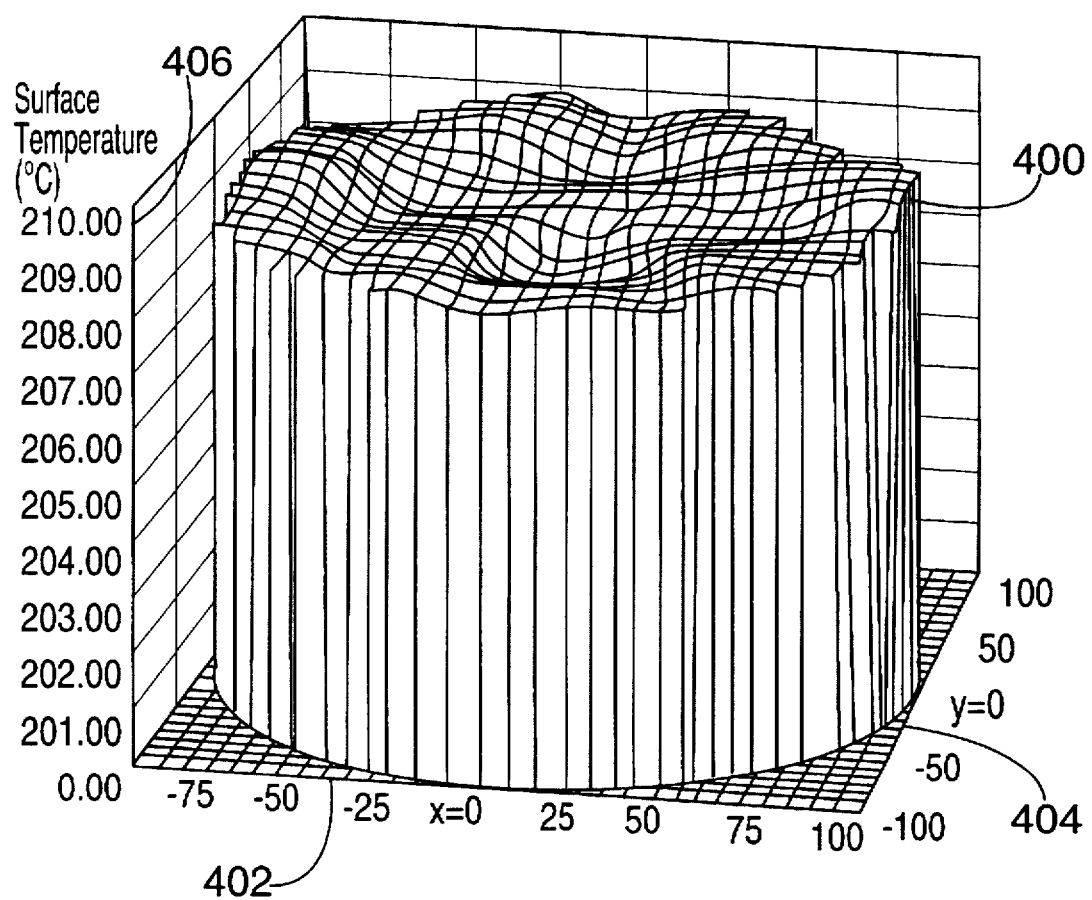
FIGS. 4, 5, and 6 depict graphs representing temperature data collected using the present invention in the wafer processing system of FIG. 3.
Figure 5:
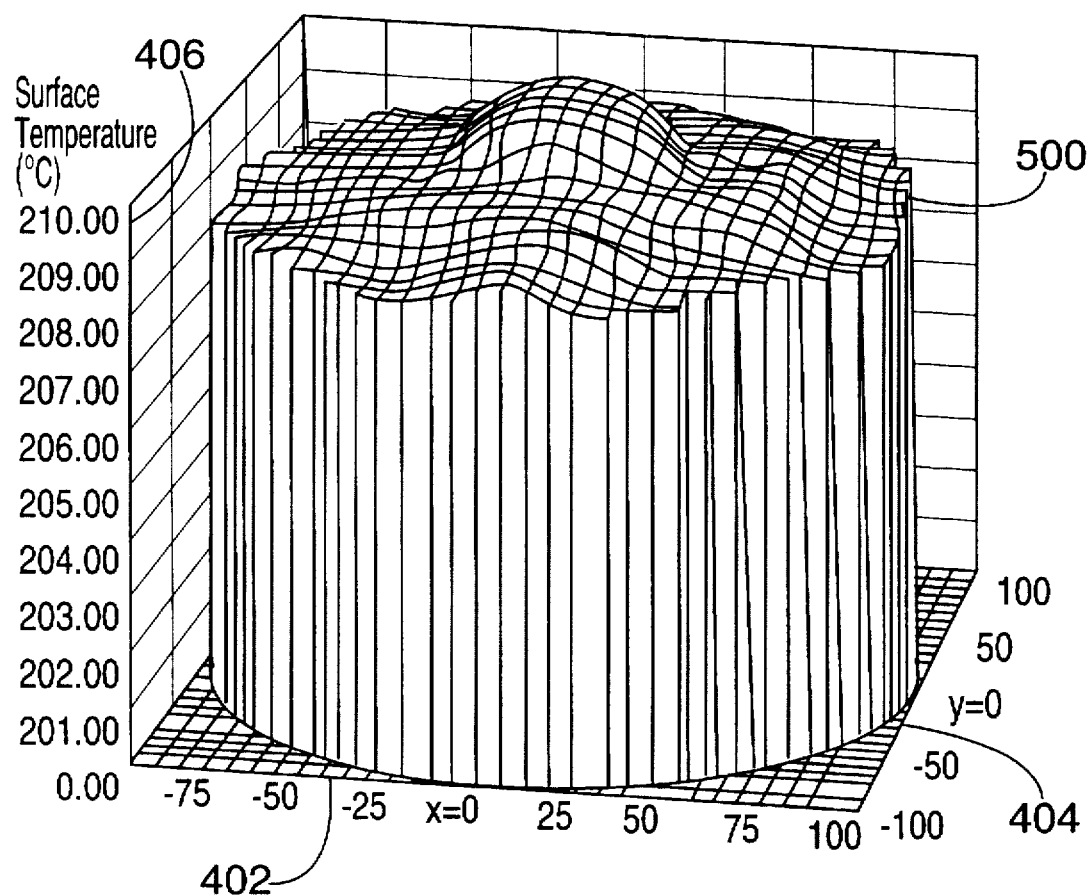
Figure 6:
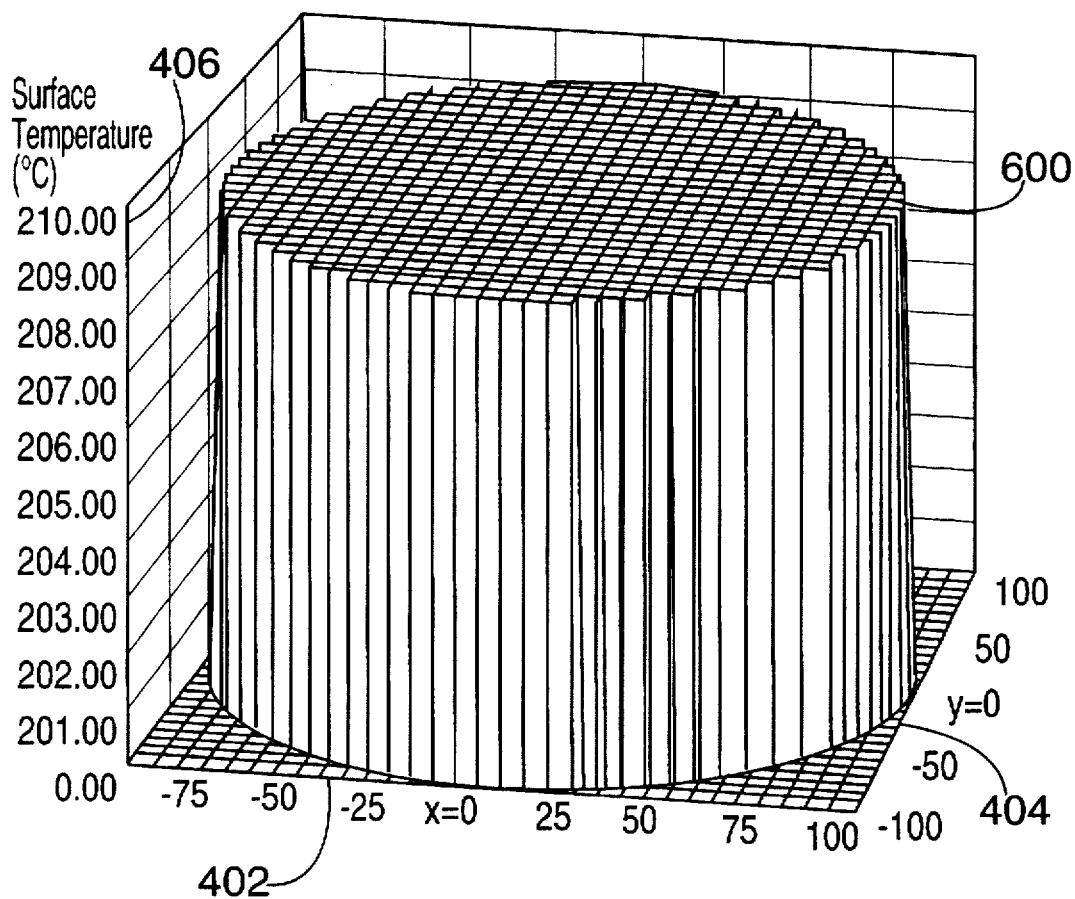

For example, FIGS. 4, 5 and 6 depict three-dimensional graphs 400, 500 and 600 of temperature data collected using the inventive diagnostic wafer within the wafer processing system of FIG. 3. The three-dimensions include the x and y axes 402 and 404 which represent position upon the diagnostic wafer and the z axis 406 represents the temperature magnitude. These graphical representations of the temperature magnitude data were produced using the data acquisition system described in U.S. patent application Ser. No. 08/621,279, filed Mar. 22, 1996. This system processes the discrete temperature measurements produced by each probe on the diagnostic wafer into a surface representation of the data.

Specifically, FIG. 4 depicts a graph 400 having a non-uniform temperature profile. The surface of the graph 400 contains a substantial depression located near the center of the surface. As such, an operator of the wafer processing system would clearly see from this graph, in real-time, that the center of the wafer was cooler than the edges thereof. Similarly, as shown in FIG. 5, the graph 502 also has a non-uniform temperature profile, where the center of the wafer has a substantially higher temperature than the edges thereof. In response to either situation, the operator adjusts the process parameters of the wafer processing system and, in particular, the plasma control parameters, to achieve a more uniform temperature profile. Importantly, while adjusting parameters such as the plasma gas flow rate, excitation energy, magnetic enhancement parameters, and the like, the operator can observe the temperature profile in a graphical display as each parameter is adjusted. The result, shown in FIG. 6, is a graph 602 having a substantially flat, uniform temperature profile across the surface of the wafer. In this manner, the operator performs a real-time optimization of the temperature profile. Of course, this optimization process can be automated using the data acquisition system as described in the cited application. Once the parameters are established for processing wafers at a uniform temperature, the diagnostic wafer is removed from the pedestal and the process wafers are processed. Intermittently, the diagnostic wafer can be repositioned in the chamber to ensure that, over time, the temperature profile has not changed.

The placebo wafer should be considered illustrative of a particular platform that can be used to support the array of temperature probes. The particular platform depends upon the application for the array of temperature probes. Other platforms include anodized aluminum, glass, plastic, ceramic and the like.

Furthermore, the forgoing description of the invention disclosed one application of the invention, e.g., within a plasma enhanced wafer processing system; however, it should be understood that this application is merely illustrative. The invention can be used in many different semiconductor processing chambers to characterize the operation of those chambers, e.g., chemical vapor deposition chambers, cooldown chambers, physical vapor deposition chambers, and the like. In its broadest sense, the present invention finds use wherever a real-time, in situ temperature profile is useful to characterize an environment, e.g., all forms of semiconductor wafer processing systems, conventional ovens, refrigeration units, and the like.

Although various embodiments which incorporate the teachings of the present invention have been shown and described in detail herein, those skilled in the art can readily devise many other varied embodiments that still incorporate these teachings.

What is claimed is:

1. Apparatus for measuring temperature comprising:

a placebo wafer; and a plurality of luminescent temperature probes affixed to a surface of said placebo wafer wherein each of said luminescent temperature probes further comprises a mound of thermally conductive material, formed upon a surface of said placebo wafer, having a portion thereof coated with a phosphor material, a fiber optic cable, having an end affixed to said placebo wafer and abutting said phosphor material to receive light produced by fluorescence of said phosphor material and an encapsulation layer, affixed to said fiber optic cable and said mound, for encapsulating said end of said fiber optic cable, said mound and said phosphor material.

2. The apparatus of claim 1 wherein said phosphor material is magnesium fluorogerminate.

3. The apparatus of claim 2 wherein said encapsulation layer is selected from the group consisting of polyimide, silicon, quartz, ceramic, and silicon carbide.

4. Apparatus for measuring temperature comprising:

a placebo wafer;

an oxide layer deposited upon a surface of said placebo wafer; and a plurality of luminescent temperature probes affixed to the oxide layer of said placebo wafer wherein each of said luminescent temperature probes further comprises a mound of thermally conductive material having a portion thereof coated with a phosphor material, a fiber optic cable, having an end affixed to said placebo wafer and abutting said phosphor material to receive light produced by fluorescence of said phosphor material and an encapsulation layer, affixed to said fiber optic cable and said mound, for encapsulating said end of said fiber optic cable, said mound and said phosphor material.

5. The apparatus of claim 4 wherein said phosphor material is magnesium fluorogerminate.

6. The apparatus of claim 5 wherein said encapsulation layer is selected from the group consisting of polyimide, silicon, quartz, ceramic, and silicon carbide.

7. A method of fabricating an array of luminescent temperature probes comprising:

providing a placebo wafer;

forming a plurality of mounds of thermally conductive material, each of said mounds having a portion therein;

coating said portion within each of said mounds with a phosphor material;

abutting an end of one of a plurality of fiber optic cables to said phosphor material of each of said mounds;

encapsulating each of said fiber optic cables within each of said mounds to impede background light from illuminating said phosphor material; and affixing a portion of each of said fiber optic cables to said placebo wafer to receive light produced by fluorescence of said phosphor material.

8. A method of claim 7 further comprising forming an oxide layer upon said placebo wafer prior to forming said mounds.

* * * * *